United States Patent [19]

Swedberg

[11] 3,862,814

[45] Jan. 28, 1975

[54] LUBRICATION SYSTEM FOR A HYDRAULIC DEVICE

[75] Inventor: Nils Einar Swedberg, Chanhassen, Minn.

[73] Assignee: Eaton Corporation, Cleveland, Ohio

[22] Filed: Aug. 8, 1973

[21] Appl. No.: 386,669

[52] U.S. Cl. .............................. 418/102, 418/61 B
[51] Int. Cl. ............................................ F04c 27/02
[58] Field of Search ........... 418/61 B, 102; 184/6.16

[56] References Cited
UNITED STATES PATENTS

| | | | |
|---|---|---|---|
| 3,572,983 | 3/1971 | McDermott | 418/61 B |
| 3,680,987 | 8/1972 | Ohrberg | 418/61 B |
| 3,723,032 | 3/1973 | Woodling | 418/61 B |

Primary Examiner—C. J. Husar
Assistant Examiner—Leonard Smith
Attorney, Agent, or Firm—Teagno & Toddy

[57] ABSTRACT

An improved lubricating system is provided for use in a hydraulic device of the type including a gerotor set, a hollowed input-output shaft extending within the device's housing and journalled therein and a main universal shaft splined at one end within the input-output shaft's hollowed end and at the other end to the rotatable member of the gerotor set. The system includes a plurality of flow passageways each of which communicates with another in series to provide a positive flow path whereby the splined drive connections and each bearing journalling the input-output shaft are lubricated before the flow is emptied to return. An adequate rate of lubricant flow into the passageways is provided by clearances within the device.

11 Claims, 5 Drawing Figures

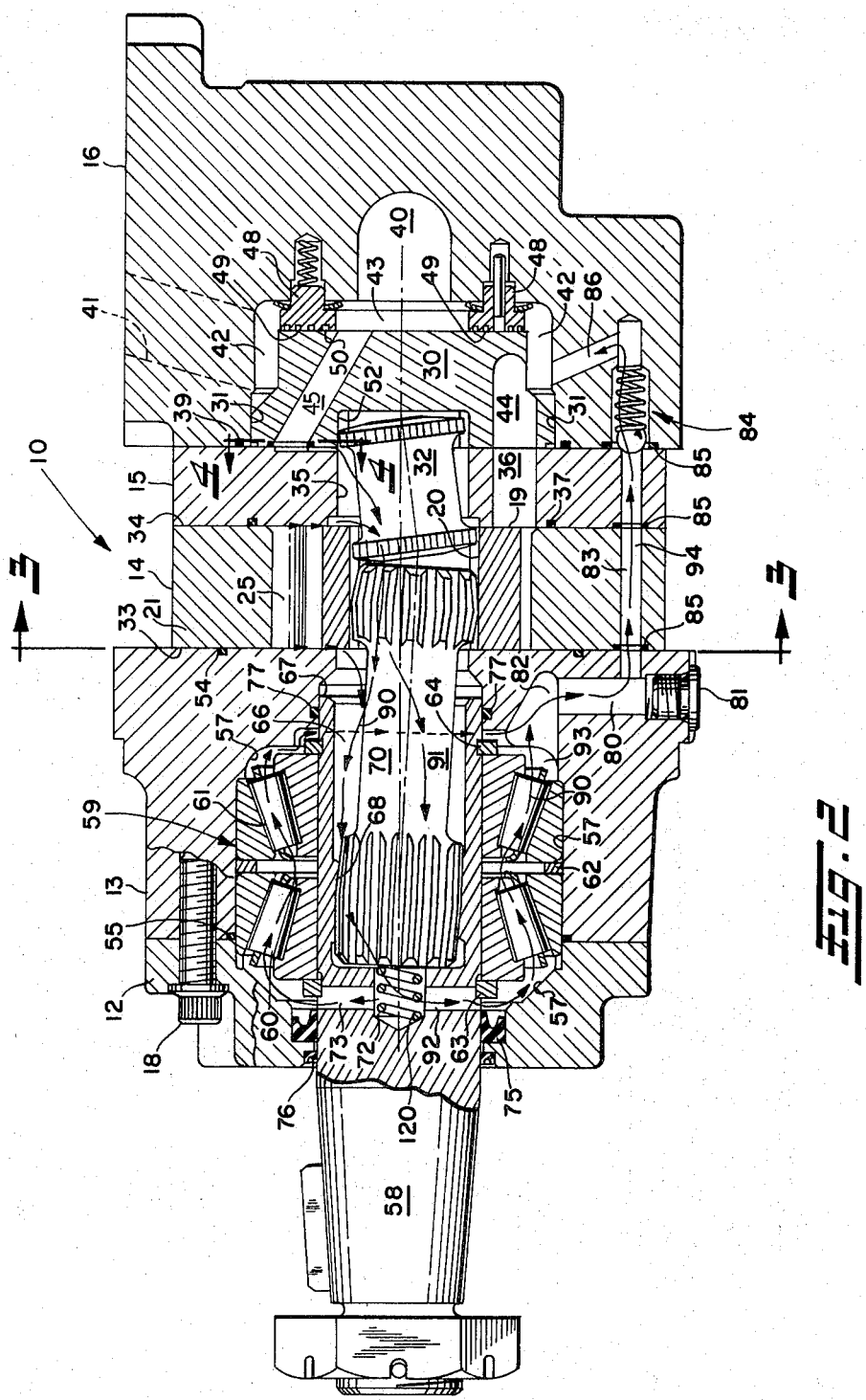

LUBRICATION SYSTEM FOR A HYDRAULIC DEVICE

This invention relates generally to hydraulic devices of the gerotor type and more particularly to a lubrication system employed in such devices.

Hydraulic devices of the gerotor type commonly comprise a gerotor set having first and second toothed members defining a plurality of volume chambers by teeth interaction. Drive to (pump) or from (motor) the rotatable toothed member of the gerotor set is commonly through a universal drive shaft splined at one end to the rotatable member and at its other end within a hollowed input-output shaft. The input-output shaft is journalled within a portion of the device's housing by a variety of radial and thrust bearing arrangements.

The splined drive connections are under considerable stress because hydraulic devices of the gerotor type are commonly used in high torque motor applications. Importantly, the stress condition is aggravated because the rotatable member of the gerotor set is typically the orbiting member and thus the universal drive shaft must likewise assume an orbiting or wobble motion. This places uneven and concentrated loadings on the splined connections in contradistinction to the usual type of splined loading wherein evenly distributed forces are transmitted along the entire length of each splined connection. If the lubricant flow through the splined connections is not sufficient to dissipate the heat generated from the spline loading and flush foreign matter between the splined connections which tend to lodge therebetween, failure prematurely occurs.

Gerotor type applications also impose relatively high radial loads on the input-output shaft member. Because the housing dimension of the device must be kept to a minimum for installation purposes, the bearings within the housing for journalling the input-output shaft must be minimized in size. The reaction force imposed on the minimumly sized, frontmost bearing from the radial loading placed on the input-output shaft is significant and frequently approaches the critical loading for such bearing. A positive flow of lubrication through the front-most bearing is thus critical to the life of that bearing.

Aware of this problem, the prior art has provided such devices with lubrication systems. One such system is shown in U.S. Pat. No. 3,572,983 and the subject invention may be viewed as an improvement thereof. Briefly the system disclosed therein and other lubricating systems provide an opening in the input-output shaft leading to the bearing arrangement thereof and a passage from the bearing arrangement to return. Because of the position of the passages, shaft opening and lack of seals to direct the lubricant flow, such systems provide lubricant flow in parallel not only to the input-output shaft bearings but also, to a lesser extent, to the front and rear splines of the main universal shaft. Thus the effectiveness of the lubrication system, its lubricant flow rate to the drive components, depends upon the clearances or passage sizes through which the flow passes. Importantly, if one of the parallel flow paths becomes blocked by foreign matter, lubricant is starved from the blocked passage and directed entirely to the passage in parallel with the blocked passage.

Flow of lubricant to the system was provided by clearances within the hydraulic device through which fluid under pressure leaked. While such clearances provided sufficient lubricant flow for relatively small devices operating at high pressures, the flow rate was only nominal for larger devices which operated at lower pressures.

It is thus a principal object of the subject invention to extend the life expectancy of drive-train components for hydraulic devices of the gerotor type by providing an improved lubrication system therefor.

This object along with other features of the subject invention is provided in a hydraulic device of the type including a gerotor set, an input-output shaft journalled within the device's housing and main universal drive shaft connecting the rotatable member of the gerotor set with the input-output shaft. The lubrication system includes a series flow path defined in part by a first flow passageway. The first flow passageway includes a splined central opening within the rotatable gerotor member which receives a splined end of the main drive shaft and a hollowed splined opening within the input-output shaft which is splined to the other end of the main drive shaft. A second flow passageway in fluid communication with the end of the first flow passageway is defined to include an opening in the input-output shaft communicating with the forward end of a stepped cylindrical opening formed within the housing which receives a bearing arrangement for the input-output shaft. A third flow passageway in fluid communication with the second flow passageway extends from the forward bearing in the bearing support arrangement to and through the rearward bearing in the arrangement. A fourth flow passageway extending from the second bearing is provided for emptying the lubricant to return. Fluid in the lubrication system is prevented from prematurely communicating with the fourth flow passageway by a seal arrangement between the housing opening and the outside diameter of the input-output shaft which is positioned closely adjacent an end face surface of the gerotor set.

In accordance with another feature of the subject invention, lubricant flow is provided into the first flow passageway by leakage from fixed clearances at the gerotor set end faces and by leakage at an end face of a valve member. The rate of leakage through these clearances increases as system pressure increases to assure adequate lubrication of the drive-train components. In larger hydraulic devices having high volumetric output and relatively low system pressures, lubricant flow into the first passageway by leakage from the valve member's end face is assisted by means of an especially cut slot in fluid communication with a port passage. The slot pulsates surges of fluid to the system as one member of the gerotor set orbits about the other.

In accordance with another aspect of the subject invention the second passageway is positioned closely adjacent a main shaft seal which prevents leakage along the shaft at the forward end of the housing. Lubricant flow in the second passageway dissipates heat from the seal and promotes seal life.

It is thus another object of the subject invention to provide in a hydraulic device of the gerotor type an improved lubrication system which is characterized in that component parts of the device's drive-train are lubricated in a series relationship.

Yet another object of the subject invention is to provide in a hydraulic device of the gerotor type, means for supplying a sufficient flow of lubricant into a lubrication system employed with the device.

Still another object of the subject invention is to provide in a hydraulic device of the gerotor type, a lubrication system which provides cooling of a shaft seal employed therein.

The invention may take physical form in certain parts and arrangement of parts, a preferred embodiment of which will be described in detail herein and illustrated in the accompanying drawings which form a part hereof and wherein:

FIG. 2 is a longitudinal sectional view taken along Line 2—2 of FIG. 1;

Figure 1:
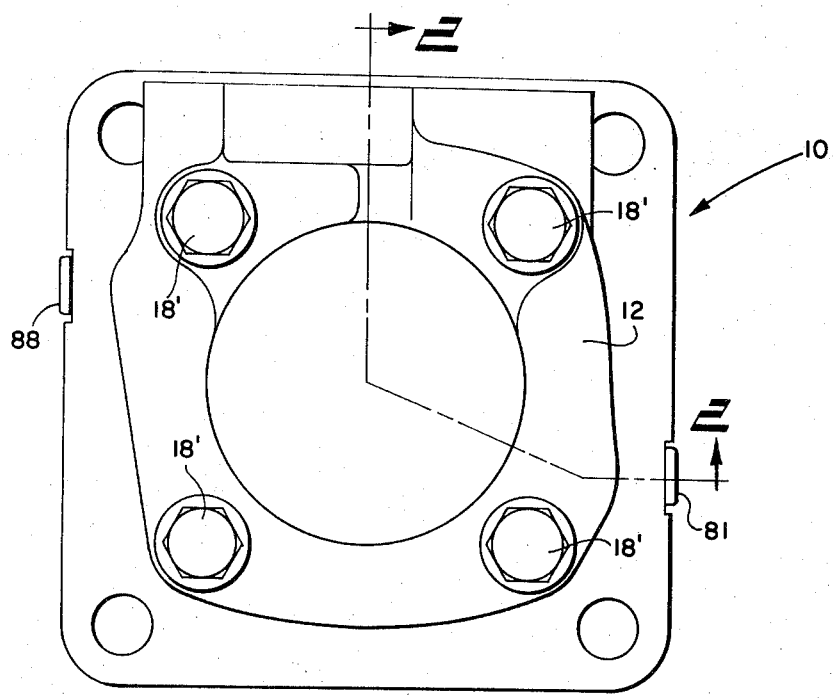
FIG. 1 is an end view of a fluid operated device of the subject invention.

Referring now to the drawings wherein the showings are for the purpose of illustrating a preferred embodiment of the invention only and not for the purpose of limiting same, FIG. 2 shows a fluid operated motor 10, it being understood that the term "motor" when applied to such fluid operated devices also encompasses the use of such devices as "pumps". Motor 10 comprises several sections secured together which include in their order from front to rear respectively, an end cap 12, a shaft support casing 13, a gear displacement unit or gerotor set 14, a port plate 15 and a valve casing 16. Sections 12 and 13 are secured together by a plurality of cap screws 18 extending from the end cap 12 and threaded into blind tapped holes in the shaft support casing 13. Sections 13-16 are secured together by fasteners 18' extending through valve casing section 16 (FIG. 1). The basic construction and operation of such a motor 10 is known to those skilled in the art and will be better understood than will be explained herein by reference to U.S. Pat. No. 3,572,983 to H. McDermott.

Figure 3:
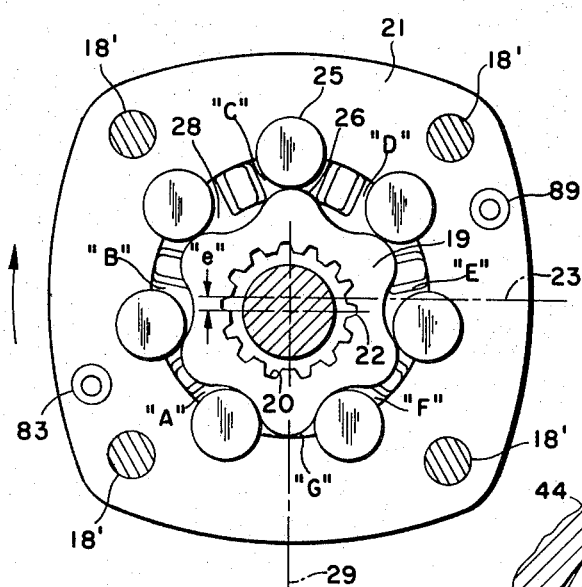
FIG. 3 is a sectional view taken along Line 3—3 of FIG. 2.

Referring now to FIGS. 2 and 3, the gerotor set 14 is defined as comprising an externally toothed star member 19 having a splined opening 20 extending centrally therethrough. Star member 19 is eccentrically disposed within an internally toothed ring member 21; the eccentricity "e" of the gerotor set being shown as the distance between star member's axis 22 and ring member's axis 23. In the embodiment shown ring member 21 has 7 equally spaced rollers 25 defining roller teeth which interact with 6 star teeth 26 to form 7 volume chambers 28. As known to those skilled in the art, with ring member 21 fixed against rotation as shown and fluid under pressure ported to certain volume chambers 28, the center of star member 19 will orbit circularly about the center of ring member 21 whereby the center of the star axis 22 will define a circle about the ring axis 23 equal to the eccentricity of the device e. This movement of star member 19 will expand and contract each one of the 7 volume chambers 28 while star member 19 rotates a peripheral distance equal to one of its tooth spaces or 1/6th of a revolution. More particularly, with star member 19 orbiting in the direction of the arrow shown in FIG. 3, a moving line of eccentricity 29 defined as extending between ring and star axes 22,23 divides expanding volume chambers designated A,B, and C at high pressure from contracting volume chambers designated D,E, and F at low pressure. Volume chamber designated G is defined as a switch chamber and momentarily may be between any pressure ranging from high to low. Further, as star member 19 orbits within ring member 21 the line of eccentricity 29 will rotate at the star member's orbital speed and when star member 19 has completed one orbit or operation cycle each volume chamber will have been or be at high pressure, low pressure and some differential pressure therebetween.

Disposed at one side of the gerotor set 14 may be any known type of valving arrangement which sequentially ports fluid under desired pressures to selective volume chambers 28 as noted above to achieve the desired output from star member 19. The valving arrangement could comprise a known "disc valve" arrangement whereby a valving member driven at the orbiting speed of the star member produces desired porting or, alternatively, a "commutator-type valve" arrangement could be utilized whereby a valve member driven at the rotational speed of the star member 19 achieves desired porting. A cummutator-type valve arrangement is shown in the embodiment illustrated and includes a port plate 15, a valve member 30 rotatably disposed within an opening 31 in valve casing 16 and a universal valve drive shaft 32 for rotating valve member 30.

Port plate 15 abuts an end face 34 of the gerotor set 14 and is defined as having a central opening 35 extending therethrough and 7 radially spaced port plate passages 36 which are circumferentially alinged with volume chambers 28. An O-ring seal 37 between ring member 21 and port plate 15 prevents leakage of fluid to the outside of the motor 10.

Valve casing 16 abuts port plate 15 and an O-ring seal 39 is provided therebetween to prevent leakage of fluid to the outside of motor 10. Opening 31 in valve casing 16 is in fluid communication with interchangeable inlet and outlet ports 40,41 respectively. When valve member 30 is positioned within opening 31, an annular first chamber 42 is formed between the valve member's periphery and opening 31 and is in fluid communication with outlet port 41. Also a centrally located second chamber 43 is formed between the rear of valve member 30 and opening 31 and is in fluid communication with inlet port 40. First chamber 42 in turn is in fluid communication with 6 interchangeable valve outlet passages 44 extending through valve member 30 which are radially spaced and circumferentially aligned with port passages 36. Second chamber 43 is in communication with 6 interchangeable valve inlet passages 45 extending through valve member 30. Valve inlet passages 45 are radially spaced between valve outlet passges 44 and circumferentially aligned with port plate passages 36. Valve member 30 is biased against port plate 15 by a plurality of known floating valve seats 48 positioned between the rear of the valve member and the valve casing's opening 31 and thus interposed between the first and second chambers 42,43 respectively.

Each valve seat 48 includes a plurality of inner and outer concentric grooves 49,50 adjacent the rear of the valve member respectively; with the outermost groove in fluid communication with first and second chambers 42,43 and the innermost groove leading through the valve seat to return. Pressure differential between first and second chambers 42,43 causes high pressure to traverse the grooves before emptying to return so that the portion of valve member 30 adjacent low pressure volume chambers D,E,F is sealed from that portion of the valve member adjacent high pressure volume chambers A,B,C. A detailed description of valve seats 48 is set forth in the aforementioned McDermott patent with a major difference between the valve seats disclosed therein and those of the present invention being the elimination of slots in the valve plate of McDermott which communicate the innermost valve seat groove with port plate opening 35.

At the forward end of valve member 30 is a centrally located splined recess 52. Valve drive shaft 32 is splined at one end to recess 52, extends through port plate opening 35 and is splined at its other end to opening 20 in star member 19. Fluid under high pressure is thus ported by valve member 30 through port plate passages 36 to certain volume chambers and likewise exhausted from other volume chambers causing the star member to rotate and orbit as hereinbefore noted. Rotation of star member 19 likewise rotates valve member 30 via valve drive shaft 32 to sequentially advance the porting of volume chambers 28 as defined by movement of the line of eccentricity 29.

Shaft support casing 13 abuts an end face 33 of the gerotor set opposite the port plate end face 34 and is sealed therebetween as at 54 to prevent leakage at the exterior of the motor housing. End cap 12 in turn abuts the opposite end of shaft support casing 13 and is likewise sealed as at 55 to prevent leakage at the exterior of the motor housing. End cap 12 and shaft support casing 13 define an especially configured cyclindrically stepped opening 57 extending therethrough. An input-output shaft 58 extends within opening 57 and is journalled therein by a tapered, roller bearing arrangement 59 which resists axial and radial loads placed on shaft 58. Bearing arrangement 59 includes forward and rearward tapered roller bearings 60,61 respectively, which are spaced from one another by a spacer ring 62 positioned between each bearing's outer race. Input-output shaft 58 is limited in its axial movement by forward and rearward snap rings 63,64 positioned in grooves formed on the outside of shaft 58 and which abut the inner races of forward and rearward bearings 60,61 respectively.

Input-output shaft 58 has a first bore 66 extending forwardly therein from its rearward end 67. Shaft 58 is internally splined about a portion of first bore 66 as at 68 where it receives in splined engagement an end of a universal main drive shaft 70. Main drive shaft 70 is similarly splined to the central opening 20 in star member 19 at its other end. Because of the crowned configuration of the splined ends of main drive shaft 70, hypocycloidal motion of star member 19 as described above transmits an orbiting non-driving motion to main drive shaft 70 and also a driving rotational movement through the splined connection therebetween. Main drive shaft 70 rotates input-output shaft 58.

The first bore 66 within input-output shaft 58 terminates at a second smaller concentric bore 72 which in turn leads to a passage 73 which extends radially through shaft 58. Radial passage 73 is in fluid communication with a portion of cylindrically stepped opening 57 in end cap 12 adjacent forward bearing 60. Radial passage 73 also provides fluid communication with a main seal 75 which, along with a secondary seal 76 at the front end of cap section 12, prevents fluid from leaking along the shaft section out the forward end of the motor. A seal 77 in shaft support casing 13 adjacent rearward end 67 of input-output shaft 58 prevents fluid from communicating in the space between the outside diameter of shaft 58 and the rearward edge of cylindrically stepped opening 57 in shaft support casing section with roller bearing arrangement 59.

Adjacent the rearward end of shaft support casing 13 is a radially inwardly extending case drain passage 80 which is shown sealed at the exterior of shaft support casing 13 by a drain cap 81. Radially extending drain passage 80 extends inwardly until communicating within an especially configured pocket 82 which in turn communicates with shaft support casing opening 57 adjacent rearward bearing 61. Radially extending drain passage 80 also communicates with an axially extending drain passage 83 which extends from shaft support casing 13 through ring member 21 of gerotor set 14, through port plate 15 and into valve casing 16 wherein a check valve 84 of the spring biased ball type is provided. Seals 85 are provided as axial drain passage 83 traverses each motor section 13-16 to prevent fluid leakage at the exterior of the motor. Axial drain passage 83 communicates with first chamber 42 within valve casing 16 by means of an inwardly extending passage 86 within the valve casing. Not shown except for a second drain cap 88 in FIG. 1 and a second axial passage 89 in FIG. 3 is a second drain passage arrangement identical to that previously described except that its inwardly extending passage in valve casing 16 communicates with second chamber 43.

OPERATION

With high pressure supplied to inlet port 40 and exhausted at low pressure from outlet port 41 motor 10 will operate to drive the input-output shaft 58 as noted above. Additionally fluid will flow in the direction of the arrows shown in FIG. 2 to define a series flow path 90 which defines the lubrication system of the subject invention. The series flow path 90 is more paritcularly defined by a first flow passageway 91 communicating with a second flow passageway 92 which in turn communicates with a third flow passageway 93 and third flow passageway 93 in turn communicates with a fourth flow passageway 94. The first flow passageway 91 is defined by the space encompassed by splined opening 20 of star member 19, the space defined by the first bore 66 within input-output shaft 58 and the portion of cylindrically stepped opening 57 between the rearward end 67 of input-output shaft and the shaft casing end face 33 of the gerotor set. First flow passageway 91 provides a positive flow of fluid through the main drive shaft's splined connections to create a flushing action through the splines which washes away foreign particles or contamination so that same does not become lodged in the splined mesh which occurred in prior art systems.

Second flow passageway 92 is defined as the second concentric bore 72 and radially extending passage 73 in input-output shaft 58 and that portion of the cylindrically stepped opening 57 in the shaft support casing 13 adjacent main seal 75. Flow through second flow passageway 92 maintains input-output shaft 58 cool over its seal area to prevent overheating of seal 75 and premature failure thereof.

Third flow passageway 93 is defined as that portion of the cylindrically stepped opening 57 within the shaft support casing 13 which includes the space occupied by forward and rearward bearings 60,61 and that portion of the opening extending rearwardly of rearward bearing 61 which communicates with especially configured pocket(s) 82 in the shaft support casing. Third flow passageway 93 provides positive flow of fluid through forward bearing 60 for cooling and flushing of same. As can be appreciated, forward bearing 60 is the heaviest loaded bearing since it is nearest any imposed radial load placed on input-output shaft 58. Because size limitations of shaft support casing 13 also limit the size of the bearings therein, it is important from a bearing lift consideration that positive flow be provided through forward bearing 60. Additionally, the same amount of flow is routed through the rearward bearing 61 to provide adequate cooling and flushing of that bearing. Lubrication of the rearward bearing 61 is critical in series motor applications where lubrication pressure is high enough to exert significant thrust load on input-output shaft 58.

Fourth flow passageway 94 is defined as that portion of the series flow path 90 leading to return and includes radial drain passage 80, axial drain passage 83, check valve 84 and inwardly extending passage 86 when fluid is supplied under pressure to motor inlet port 40 and exhausted from outlet port 41. When input-output shaft rotation is desired to be reversed, fluid under pressue is supplied to outlet port 41 and exhausted from inlet port 40 and the second drain passage arrangement (not shown) is defined as fourth flow passageway 94. When the first drain passage arrangement (shown) is connected to return, lubricant flow through the second drain passage arrangement (not shown) to high pressure is prevented by the check valve in the second passage arrangement and vice-versa.

In certain motor applications, either drain cap 81,88 and a line leading to the sump may be threaded into the radial passage and the lubricant flow filtered and cooled by known means (not shown) if desired. In such installations lubricant flow is directed to return downstream of the check valve rendering the check valve ineffective to control lubricant system pressure. In other installations lubricant flow passes through the check valve to return. Since the check valve is normally set to open between 15 and 20 psi and the ball thereof is unseated when lubricant pressure exceeds return pressure acting behind the ball by this amount, the lubricant pressure is always 15 to 20 psi greater than return pressure even if return be pressurized which occurs in series motor applications.

Means are provided within motor 10 to provide fluid flow into first passageway 91 and includes leakage along end faces 33,34 of gerotor set 14 and leakage between the interface of port plate 15 and valve member 30. More particularly, the axial length of the ring rollers 25 and star member 19 is sized approximately 0.001 inch less than the axial length of ring member 21 to arrive at an operation fit between the members. Thus fluid from high pressure volume chambers leaks through the gerotor end face clearances to supply lubricant flow to first flow passageway 91. Additional flow also occurs from leakage at the face of the valve member's interchangeable inlet passages 45 which port with port plate passages 36 communicating with volume chambers at high pressure. This leakage necessarily results from rotation of the valve member 30 and is not prevented by floating valve seats 48 which act to seal high pressure chambers on one side of the line of eccentricity 29 from low pressure volume chambers on the other side of the line. Leakage from the valve member's clearance is estimated to comprise 10 to 20 percent of the total lubricant flow and the lubricant flow rate through all the aforementioned clearances necessarily increases as loading of the input-output shaft increases. This results in greater pressure generated in the volume chambers and correspondingly a greater lubricant flow rate to compensate for the increased heat and forces developed at the driving spline connections as shaft load increases.

As thus described substantially all the lubricant flows first through the splined connection between the main drive shaft 70 and star member 19, then the splined connection between main drive shaft 70 and input-output shaft 58 following which flow path 90 respectively lubricates seal 75, forward bearing 60 and rearward bearing 61 in that order before emptying to return. Heretofore, prior art systems employed flow branches in parallel to the bearings with the result that different flow rates traversed each bearing and if one branch became clogged of foreign matter all flow was directed through the other branch. Furthermore leakage of lubricant to return always occurred through the clearance between input-output shaft 58 and cylindricaly stepped opening 57 at the rearward end 67 of shaft 58, which while small, nevertheless resulted in some loss of the main body of lubricant flow through the splined connection between main drive shaft 70 and input-output shaft 58. With reference to the latter point, field investigations have revealed fractures of splined connections due to the heat generated in the splined connections which was sufficient to substantially discolor the metal even though the splines are formed from high alloy, case-carburized steel. Thus it is believed that any loss of lubricant flow through the splined connections is critical.

Figure 5:
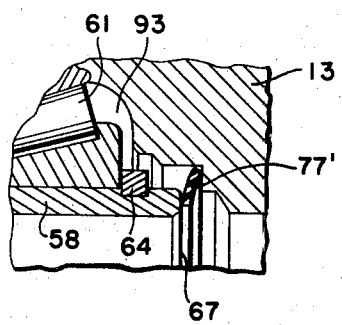
FIG. 5 illustrates an alternative seal arrangement which may be employed in the subject invention.

The subject invention overcomes the above-noted deficiencies by arranging its flow passageways 91–94 in series and providing seal 77 which prevents lubricant flow returning to drain from first flow passageway 91 by the clearance at the rearward end 67 of input-output shaft 58 with the cylindrically stepped opening 57. It is contemplated that any known type of seal can be substituted for O-ring seal 77 shown in FIG. 2. Thus FIG. 5 illustrates the use of an edge seal 77' which will likewise adequately function for its intended purpose. That is, the pressure upstream of the seal in third flow passageway 93 is not significantly greater than the pressure downstream of seal 77' in first flow passageway 91 and seal 77' is not deflected out of sealing engagement with rearward end 67 of shaft 58.

Figure 4:
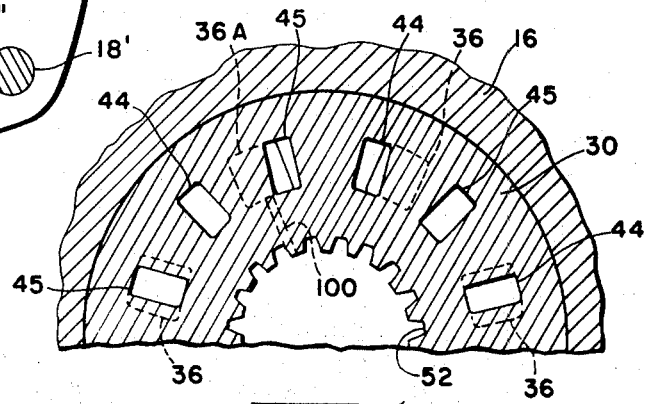
FIG. 4 is a partial, section view illustrating an alternative embodiment of the subject invention taken generally along Line 4—4 of FIG. 2.

While the lubrication system of the subject invention as thus described will function to adequately lubricate the drive-train components of motor 10, an additional source of lubricant supplied to series flow path 90 is provided for large size hydraulic devices which operate at high volumetric output and correspondingly low pressure. Thus there is shown in FIG. 4 a lubricating slot 100 leading from one of the 7 port plate passges 36 identified as port 36A and slot 100 is in fluid communication with first flow passageway 91. Slot 100 is shown in FIGS. 2 and 4 as cut at the interface of port plate 15 with valve member 30, although a slot 100 could take a form of a hole and be positioned at any axial distance within port plate 15. As will be apparent to those skilled in the art, each orbit or operational cycle of the gerotor set 14 will communicate high pressure to slotted port passage 36A at least three times. Slot 100 will thus pump or pulsate fluid flow to first flow passageway 91 three times during each orbit of star member 19 and since star member 19 orbits at relatively high speed, a steady pulsation of fluid will be provided to the lubrication system at a rate significantly larger than that which occurs from all the other aforementioned clearances combined. Because lubricant pressure is not significantly higher than return pressure, gerotor teeth interaction of gerotor geometry will not be adversely effected by lubricant pressure attempting to bleed back into port passage 36A when same communicates with volume chambers at low pressure.

Heretofore an additional source of lubricant flow into the flow path was provided in U.S. Pat. No. 3,572,983 by openings in the valve member which provided fluid communication between the flow path and floating balancing seats at the rear of the valve member. Tests conducted on this arrangement indicated that high pressure flow through the valve seats was in parallel with one branch communciating with the flow path through the openings in the valve member and the other parallel branch providing flow to return by deflecting an edge seal in the seat. Flow through either passages was thus determined by pressure differential between working pressure and lubricant pressure on the one hand and the differential between working pressure and return pressure plus the pressure required to deflect the edge seal on the other hand. When working pressure was increased, minimal flow was ported to the flow path. In the subject invention, slot 100 will always supply an additional source of fluid to system and the fluid supplied will remain proportional to working pressure.

The lubrication system disclosed thus extends the life of the spline drive connection of the hydraulic device. To further improve the spline connections and in conjunction with the lubrication system, there is shown in FIG. 2, a spring 120 within second bore 72 of the input-output shaft which maintains main drive shaft 70 in contact with the valve drive shaft 32.

Tests have shown that if the main drive 70 is maintained in a fixed axial position, a tooth wear pattern develops resulting in an improved load distribution in the spline connections, e.g., a larger number of spline teeth will come in contact and share the torque load as the wear pattern develops. Evenutally, all spline teeth will come into driving engagement, which is desired from a minimum stress of maximum life consideration.

Tests also show that the main drive 70 shifts axially relative to the star member and input-output shaft when the motor operation changes from motoring to dynamic braking, which for instance is a frequency occurrence in a hydraulic propelling circuit application.

Allowing the main drive 70 to shift within its confinements prevents the development of the proper wear pattern for improved load distribution, causing a few spline teeth to be loaded in the nature of a concentrated or a point type loading. The axial shift force developed in the spline mesh is proportional to the torque loading and the drive-train geometry. To promote the development of the aforesaid proper wear pattern spring 120 is sized as a function of the maximum torque developed on the input-output shaft to always maintain the main drive shaft 70 in a fixed axial position.

It is thus the essence of the subject invention to provide in a hydraulic device of the gerotor type, means for increasing the life of the drive-train components therein.

Having thus defined my invention, I claim:

1. A lubrication system for use in a rotary fluid pressure device of the type having an inlet, an outlet and includng a gerotor set having first and second toothed members defining a plurality of volume chambers by tooth interaction therebetween, valving means for prviding fluid communication sequentially between the inlet and the outlet, through each volume chamber whereby one of said members partakes of orbital movement with respect to the other and one of said members partakes of rotational movement with respect to the other, a first shaft in driving relationship with said toothed member having rotational movement and a second shaft in driving relation with said first shaft, a housing having an end portion with a cylindrically stepped opening extending therethrough for receiving said first and second shafts, and bearing means including first and second axially spaced bearings within said steped opening for journalling said second shaft, said lubrication system comprising:

first passageway means for providing fluid communication between said first shaft and said member having rotational movement and between said first shaft and said second shaft;

means for providing pressurized fluid to said first passsageway means;

second passageway means defining a passage in series flow relationship with said first passageway means for providing fluid communication in series to said first and second bearings; and means within said device for providing fluid communication between said second passageway means and said outlet.

2. The lubrication system of claim 1 wherein said gerotor set includes a fixed, internally toothed ring member and an externally toothed star member adatped to orbit and rotate relative to said ring member, said star member having a splined, central opening extending therethrough;

said first shaft defined as a universal, main drive shaft having splined ends, one end in splined engagement with said opening in said star member;

said second shaft defined as an input-output shaft having a first bore entending therein from an end thereof adjacent said gerotor set, said first bore splined about a portion thereof and said prtion in splined engagement with the other splined end of said main shaft;

said first passageway means including a first fluid flow passageway defined as space encompassed by said opening in said star member, space encompassed by said first bore and space encompassed by a portion of said stepped opening extending between said end of said input-output shaft and said gerotor set, said bearing means including forward and rearward tapered roller bearings within said stepped opening; and said second passageway means including third and fourth fluid flow passageways, said third fluid flow passageway defined as space encompassed by a second portion of said stepped opening which houses said forward and rearward bearings and extends to a point adjacent said end of said input-output shaft and space defined by a passage defined by said housing, said passage communicating with said stepped opening, said fourth fluid flow passageway in series relation with third flow passageway and defined by a second passage in said housing communicating with return.

3. The lubrication system of claim 2 wherein sealing means adjacent said end of said input-output shaft prevents fluid communication between said first and third fluid flow passageways.

4. The lubrication sytem of claim 3 wherein said input-output shaft has a second bore, concentric with said
said bore and extending therefrom, a radial passage extending through said input-output shaft from said second bore and communicating with a third portion of said stepped opening, said third portion defined as space encompassed by said opening extending forwardly of said forward bearing;
a main seal between said input-output shaft and said stepped opening positioned forwardly of said forward bearing, a portion of said main seal in fluid communication with said third portion of said stepped opening; and
said first passageway means further including a second flow passageway inbetween said first and third flow passageways, said second flow passageway defined as space encompassed by said second bore, said radial passage and said third portion of said stepped opening.

5. The lubrication system of claim 4 wherein said star member has an axial length less than said ring member which defines an end face clearance therebetween said end face clearance in fluid communication with said first flow passageway; and
said means for providing fluid communication to said first passageway means includes said end face clearance.

6. The lubrication system of claim 5 wherein said valving means includes a valve member rotatable with respect to said ring member and having a plurality of valving passages wtherein opening to an end face thereof, said valve member end face providing a clearance opening in fluid communication with said first flow passageway upon rotation of said valve member; and
said means for providing fluid communication to said first passageway means further includes said valve clearance.

7. The lubrication system of claim 6 wherein a port plate abuts one side of said gerotor set, said port plate having a plurality of port passages extending therethrough which are equal in number and spaced to be in fluid communication with said volume chambers, said port plate having a central opening extending therethrough in fluid communication with said first flow passageway and a slot extending from one of said port passages to said central opening to provide fluid communication from said port passage to said first flow passageway; and
said means for providing fluid communication with said first passageway means further including said slot in said port plate.

8. A rotary fluid pressure device including an inlet and outlet, comprising:
a gerotor set having a fixed internally-toothed ring member and a movable externally-toothed star member eccentrically disposed therein, said ring and star members defining a plurality of volume chambers by teeth interaction therebetween,
valving means for sequentially porting high and low pressure to selective volume chambers whereby said star member partakes of hypocycloidal movement;
a front housing portion abutting said ring member and having a cylindrically stepped opening extending therethrough, said star member having a centrally splined opening therethrough concentric and in fluid communication with said stepped opening,
an input-output shaft extending within said stepped opening and having a bore extending therein from the end thereof adjacent said gerotor set and a radial passage extending through said input-output shaft from said bore and in fluid communication with said stepped opening;
bearing means for journalling said input-output shaft within said front housing portion, said bearing means including forward and rearward bearings positioned in said stepped opening;
a universal main drive shaft splined at one end to said opening in said star member, extending within said bore and splined at its other end to said bore;
lubricating means within said device comprising a fluid flow path including the space defined by the splined connection between said main shaft and said star member, the space defined by the splined connnection between said main shaft and said input-output shaft, passages defined by said forward bearing and said rearward bearing in series; and
means in said device for providing fluid communiation between said fluid flow path and said outlet means.

9. The rotary fluid device of claim 8 wherein said lubricating means further includes a seal in sealing engagement with said stepped opening and said input-output shaft and positioned between the end of said shaft and said rearwrd bearing to assure the series flow relationship of said flow path.

10. The rotary fluid device of claim 9 wherein said valving means includes a port plate having a plurality of port passages extending therethrough, each port passage in fixed fluid communication with a volume chamber; and
said means for providing lubricant to said flow path includes said port plate having a slot extending from one of said port passages and said slot in fluid communication with said flow path.

11. The rotary fluid device of claim 8 wherein said input-output shaft has a second bore concentric with said first bore and in communication therewith; and
spring means within said second bore for biasing said main shaft into a fixed axial position with respect to said input-output shaft and said star member.

* * * * *

UNITED STATES PATENT OFFICE
CERTIFICATE OF CORRECTION

Patent No. 3,862,814          Dated January 28, 1975

Inventor(s) Nils Einar Swedberg

It is certified that error appears in the above-identified patent and that said Letters Patent are hereby corrected as shown below:

Col. 11, claim 4,
line 14:                "said" should read "first".

Col. 11, line 42:       Correct the spelling of "therein".

Col. 12, line 44:       Correct the spelling of "rearward".

Signed and sealed this 15th day of April 1975.

(SEAL)
Attest:

RUTH C. MASON
Attesting Officer

C. MARSHALL DANN
Commissioner of Patents
and Trademarks